(12) United States Patent
Mous

(10) Patent No.: US 6,191,961 B1
(45) Date of Patent: Feb. 20, 2001

(54) DC HIGH VOLTAGE GENERATOR

(75) Inventor: Dirk J. W. Mous, Eb Nieuwegein (NL)

(73) Assignee: High Voltage Engineering Europa B.V., Amersfoot (NL)

( * ) Notice: Under 35 U.S.C. 154(b), the term of this patent shall be extended for 0 days.

(21) Appl. No.: 09/353,020

(22) Filed: Jul. 13, 1999

(51) Int. Cl.[7] .................................................. H02M 1/12
(52) U.S. Cl. .................................................. 363/47
(58) Field of Search ............................ 363/52, 47, 17, 363/125, 132

(56) References Cited

U.S. PATENT DOCUMENTS

| | | |
|---|---|---|
| 4,685,041 * | 8/1987 | Bowman et al. ............... 363/40 |
| 5,343,381 * | 8/1994 | Bolduc et al. ............... 363/47 |
| 5,708,573 * | 1/1998 | Lusher et al. ............... 363/47 |

* cited by examiner

*Primary Examiner*—Shawn Riley
(74) *Attorney, Agent, or Firm*—Dorsey & Whitney LLP

(57) ABSTRACT

A DC high voltage generator includes an AC power supply, an AC-DC rectifier and means to stabilize the DC high voltage generator against load variations. The stabilizer means uses at least two electro-magnetically coupled resonant circuits, which compensate the load variations at an operating frequency in such a way that the output voltage is essentially constant.

25 Claims, 3 Drawing Sheets

DC HIGH VOLTAGE GENERATOR

BACKGROUND OF THE INVENTION

1. Field of the Invention

The invention relates to a DC high voltage generator comprising an AC power supply, an AC-DC rectifier, as well as means for stabilizing the DC high voltage generator against load variations Such DC high voltage generators are well known and capable of producing DC voltages ranging from a few kV up to several MV. In particular, but not limited thereto, such DC high voltage generators are used to operate linear accelerators in which ions, electrons or other charged particles are accelerated to high energies. Beside the need for a DC high voltage, some applications of linear accelerators like electron irradiation, ion implantation and positron emission tomography (PET), require the availability of high output powers, ranging from a few hundred Watts up to several tens of kW and above. All these applications are similar in that the power from the DC high voltage generator is used to accelerate a charged particle beam originating from a suitable source.

2. Background Art

DC high voltage generators usually apply an all solid state high frequency (typically 20–200 kHz) switched mode power (SMP) converter that supplies AC power to an AC-DC rectifier comprising one or more cascade rectifiers which in turn creates the DC high output voltage. An interface between the converter and the AC-DC rectifier generally comprises a transformer, a coil and possibly additional passive electrical components in order to match the converter's impedance to that of the cascade rectifier.

In some applications, the AC-DC rectifier(s) is extended with an electrical resonant circuit to form a high voltage stack. Examples of DC high voltage generators that apply such a resonant circuit are the "Dynamitron" (see e.g. IEEE Trans. Nucl Sci. NS-16 (3)(1969),124), the "Cascade transformer high voltage generator" (U.S. Pat. No. 3,596,167), the "Nested high voltage generator" (U.S. Pat. No. 5,124,658) and a Cockcroft-Walton high voltage power supply (see e.g. IEEE Trans. Nucl Sci NS-16 (3)(1969),117).

However, the sources referred to above are unavoidably susceptible to sudden discharges in which case the charged particle beam disappears instantaneously and the needed output power is promptly reduced to nearly zero. Consequently, these applications, and others that are similar, require is an optimal transient behaviour of the DC high voltage generator.

It is well known to those skilled in the art that the output power of such DC high voltage generators is determined by the duty cycle of the switching devices in the converter, regardless of the application of one of the described resonant circuits. During variations in load, the output voltage of the generator is kept constant by regulating the duty cycle.

A drawback of such an output voltage control is that transient behavior depends on the performance of the feedback-loop and consequently overshoot and/or undershoot during transients are fundamentally unavoidable.

Another drawback of the known high frequency, high power DC generators is that switching losses present in the converter may become unacceptable if no remedial measures are taken. One possible way to eliminate these switching losses is to operate the converter in zero voltage switching mode (ZVS). ZVS is characterized in that the turn-on and turn-off of the switching devices is done at moments at which the voltage across the corresponding switching devices is close to zero. However, ZVS requires an inductive load to be present at the converter's output.

The performance of DC high voltage generators would therefore greatly benefit from an electrical design which inherently stabilizes the DC output voltage for optimal transient behavior and which furthermore enables the switching power converter to be operated in zero voltage switching mode to virtually eliminate switching losses.

SUMMARY OF THE INVENTION

It is the main purpose of the present invention to create a DC high voltage generator with optimal transient behavior. It is also the purpose of the present invention to realize such an electrical design in a cost-effective manner. In addition to this, the present invention enables the AC power supply to operate without switching losses and eliminates problems associated with the leakage inductance and interwinding output capacitance of the transformer.

In order to accomplish these goals, a DC high voltage generator according to the invention is characterized in that the stabilizing means stabilize the DC high voltage generator by using at least two electro-magnetically coupled resonant circuits wherein one or more of the circuits compensates for another circuit's load variation dependency at an operating frequency in such a way that the output voltage is essentially constant. This provides an inherent stabilization of the DC output voltage of the DC high voltage generator during transient conditions.

In a prefered embodiment according to the invention the stabilizing means consist of passive components, such as inductors and capacitors, and form an interface between the AC power supply and the AC-DC rectifier. In general a DC high voltage generator comprises a transformer and according to the invention at least one passive component may be an integral part of this transformer.

These passive components create a well defined inductive load at the converter's output, which enables the converter to operate without switching losses.

The AC power supply, which in general comprises a high frequency switching power converter, which may comprise BJTs, MOSFETs, IGBTs IGCTs or MCTs being the switching devices, in a preferred embodiment according to the invention operates in zero voltage switching mode.

The AC-DC rectifier can be extended (coupled) with a resonant circuit to form a high voltage stack, and may be of the "Dynamitron", the "Nested high voltage generator", the "Cockroft-Walton type voltage multiplier" or the "Cascade transformer high voltage generator" type. In that case the high voltage stack incorporates one of the at least two electro magnetically coupled resonant circuits.

BRIEF DESCRIPTION OF THE DRAWING

The present invention may be more fully understood from the following detailed description of the prefered embodiments, reference being made to the accompanying drawings, in which.

DETAILED DESCRIPTION OF THE PREFERRED EMBODIMENTS

Figure 1:
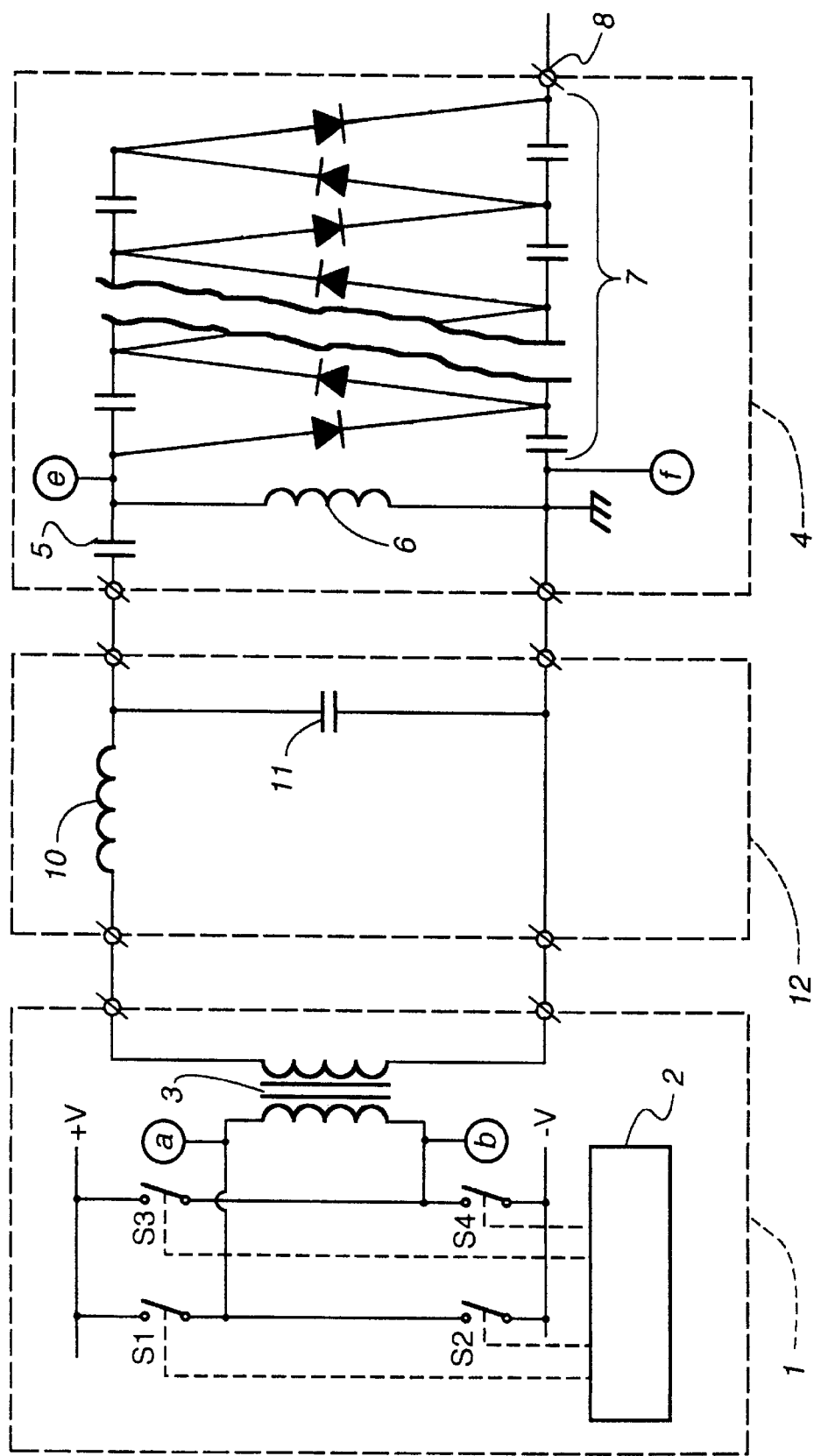
FIG. 1 shows an electrical schematic of the preferred embodiment related to the present invention.

With reference to FIG. 1 is shown an electrical schematic of the preferred embodiment. An AC power supply (1) in the form of a phase-controlled H-bridge converter comprises four switching devices S1 through S4, and a control circuit (2). In such a topology, S1 and S2 are known to form one leg of the converter and are alternatively switched on and off. Similarly, S3 and S4 form the second leg of the converter. The effective output voltage of the converter that is present between terminals a and b is controlled by changing the phase between the two legs of the converter. Any available power switching devices with proper specifications can be applied in this configuration. Bipolar Junction Transistors (BJTs), Insulated Gate Bipolar Transistors (IGBTs), Metal Oxide Silicon Field Effect Transistors (MOSFETs), Mos Controlled Thyristors (MCTs) or Integrated Gate Commutated Thyristors (IGCTs) are suitable for the switching devices.

An output transformer (3) is usually applied to match the current-voltage ratio of the AC power supply (1) to that of The AC-DC rectifier (7). It is readily understood by those skilled in the art that the switching power converter, which is characterized in that it has a high power-frequency product, is preferably operated in zero voltage switching (ZVS) mode, in which switching losses are essentially reduced to zero. However, ZVS requires that the zero crossings of the converter output current are lagging the zero crossings of the output voltage, which implies a dominantly inductive load at the converter output (terminals a and b in FIG. 1).

Referring again to FIG. 1, the AC-DC rectifier (7) is extended by a resonant circuit comprising at least one capacitor (5) $C_{stack}$ and one inductor (6) $L_{stack}$, to form a high voltage stack (4). By choosing the operating frequency at or close to the resonance frequency $\omega_0$ of the high voltage stack (4), which equals $(C_{stack} \cdot L_{stack})^{-\frac{1}{2}}$ for the circuit shown in FIG. 1, a high AC voltage can be created across terminals e and f. A AC-DC rectifier (7) connected to these terminals is used to create the DC high output voltage at terminal (8), which is essentially a fixed multiple of the peak voltage present at the terminals e and f. It should be noted that the described high voltage stack (4) is meant for illustration purposes only. Often, the chosen combination of the resonant circuit and the cascade rectifier (7) will be more complex and can be based on one of the principles mentioned in one of the foregoing sections. However, all possible high voltage stacks that can be applied in conjunction with the preferred embodiment of the present invention have in common that they operate at or close to a well defined resonance frequency and that they apply at least one cascade rectifier (7) for the generation of a DC high voltage.

Figure 2:
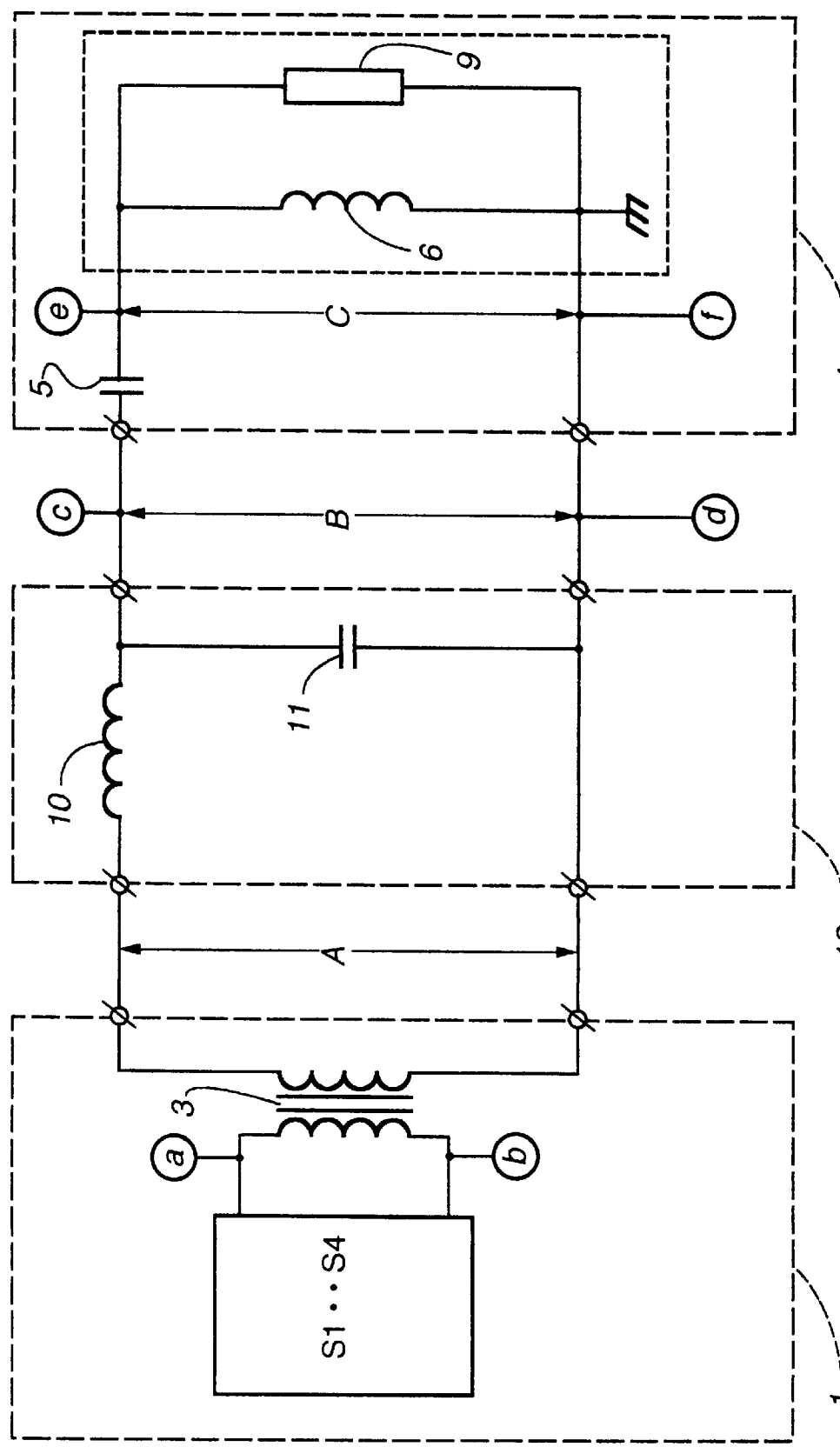
FIG. 2 shows the schematic of FIG. 1 in which essential components are shown in more detail.

In FIG. 2 the cascade rectifier (7) is replaced by a load resistor (9) $R_{load}$ for the purpose of simplicity only. It shows that the present invention comprises an inductor (10) $L_{interface}$ and a capacitor (11) $C_{interface}$ forming together a second resonant circuit being the interface (12) between the AC power supply (1) and the high voltage stack (4). With the application of such an interface (12) the transfer-function H which is defined as:
$H = V_{stack}/V_{converter}$ can be calculated, with reference to FIG. 2:

$$H = H_1 \cdot H_2$$

in which:
$H_1 = V_{interface}/V_{converter}$
$H_2 = V_{stack}/V_{interface}$
V=the voltage at A
$V_{interface}$=the voltage at B $V_{stack}$=the voltage at C $$H_1 = (Z_{Cinterface}//Z_{stack})/(Z_{Linterface} + Z_{Cinterface}//Z_{stack})$$

$$= (Z_{Cinterface} \cdot Z_{stack})/(Z_{Cinterface} \cdot Z_{stack} + Z_{Linterface} \cdot (Z_{Cinterface} + Z_{stack}))$$

in which;
// denotes a parallel connection of two impedances.
$Z_{stack}$=the impedance of the high voltage stack present at terminals c&d
   $= Z_{out} + 1/(j\omega C_{stack})$
$\omega = 2 \cdot \pi \cdot$frequency
$Z_{Linterface}$=the impedance of $L_{interface}$ (10)
$Z_{Cinterface}$=the impedance of $C_{interface}$ (11)
   $= 1/(j\omega C_{interface})$ $$H_2 = Z_{out}/Z_{stack}$$

in which:
$Z_{out}$=the impedance formed by the parallel connection of $R_{load}$ (9) and $L_{stack}$ (6) present at the terminals e and f.
   $j\omega L_{stack} \cdot R_{load}/(j\omega L_{stack} + R_{load})$ $$H = H_1 \cdot H_2$$

$$= Z_{Cinterface} \cdot Z_{out}/(Z_{Cinterface} \cdot Z_{stack} + Z_{Linterface} \cdot (Z_{Cinterface} + Z_{stack}))$$

Under resonance conditions and for relatively low output powers:

$$R_{load} >> (j\omega L_{stack}) \text{ or } Z_{out} \sim Z_{Lstack}$$

in which:
$Z_{Lstack}$=the impedance of $L_{stack}$ (6)
   $= j\omega L_{stack}$
and $Z_{stack} \sim 0$, which gives:

$$H = Z_{out}/Z_{Linterface} = Z_{Lstack}/Z_{Linterface} = j\omega L_{stack}/j\omega L_{interface}$$

$$= L_{stack}/L_{interface} \qquad \text{(equation 1)}$$

An important feature of the present invention can be seen from equation 1, which shows that under resonance conditions and relatively low output power, the voltage $V_{stack}$ at C is essentially a constant. Because the DC output voltage is a fixed multiple of $V_{stack}$, it also implies that the DC output voltage is, within limits, essentially independent of the output power and therefore inherently stable during transient conditions.

Figure 3:
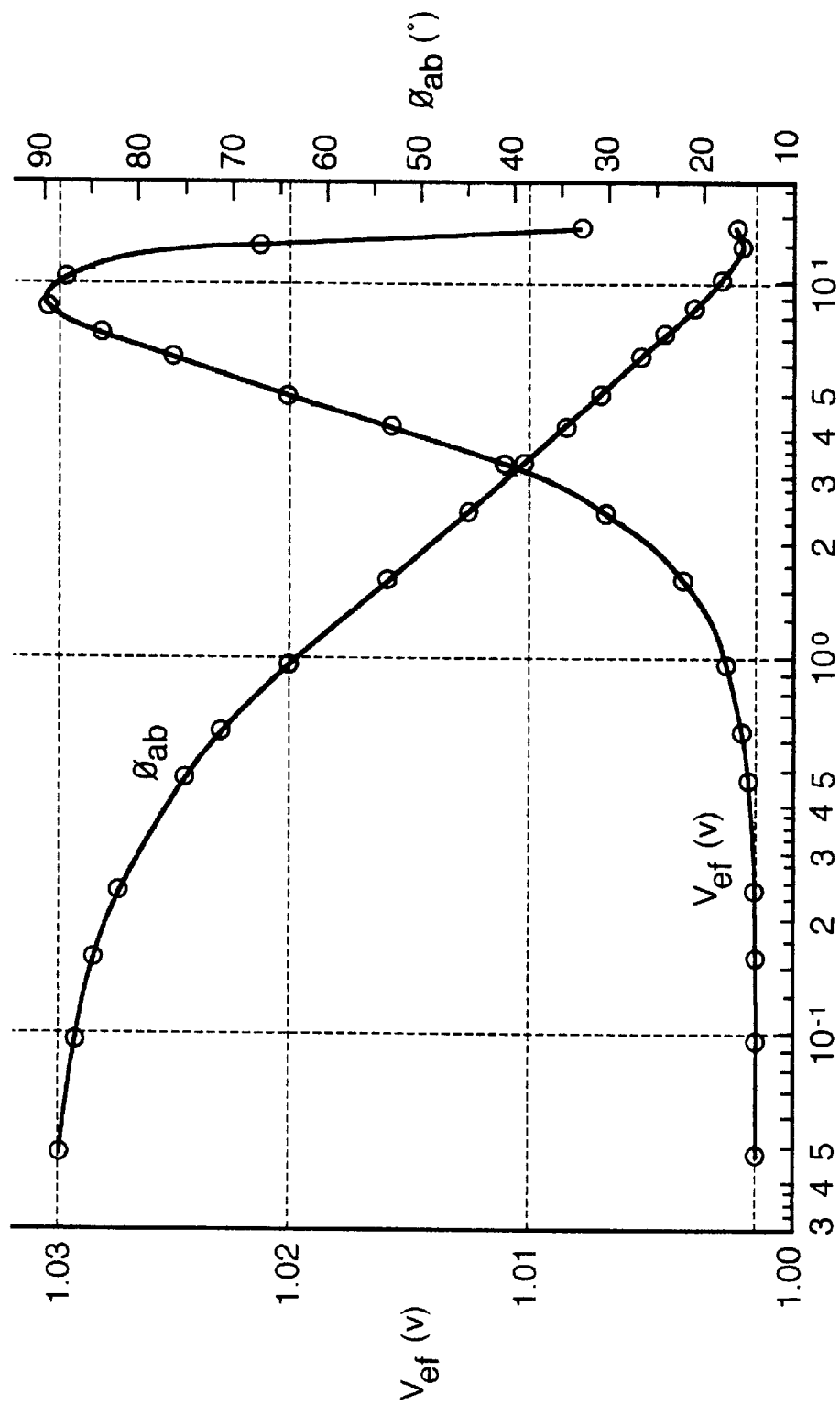
FIG. 3 is a graph which shows the output voltage $V_{stack}$ and the voltage-current phase difference $\phi$ of the converter-output as a function of the output power.

To illustrate this more strongly, FIG. 3 gives a graph which shows the relative output voltage $V_{ef}$ and the voltage-current phase difference $\phi_{ab}$ of the converter-output (terminals a and b in FIG. 2) as a function of the output power $P_{ef}$. Note that $V_{ef} = V_{stack}$. In the calculations the following input parameters and assumptions were used, which gives an operating frequency close to 100 kHz.
$L_{interface} = 1.0$ milli Henry
$C_{interface} = 2.5$ nano Farad
$L_{stack} = 30$ milli Henry
$C_{stack} = 85$ pico Farad
$V_{converter} = 1$ kV RMS The operating frequency is adjusted to give a constant 20 degrees capacitive phase at the input terminals of the high voltage stack (terminals c and d in FIG. 2). It is readily recognized by those skilled in the art that this assumption resembles a practical situation in which the operating frequency is set by controlling the input phase of the high voltage stack.

Referring again to FIG. 3, it illustrates essential features of the present invention in that:

$V_{ef}$ is essentially constant (3% variation in this example) for a wide range in output powers, which makes the DC output voltage of the high voltage generator essentially independent of the output power. This in turn implies optimal transient behavior.

The voltage-current phase difference $\phi_{ab}$ of the converter-output is positive under all output power conditions: the phase difference $\phi_{ab}$ is lagging in all cases. This implies that, by the application of the interface circuit, the capacitive load of the high voltage stack (terminals c and d in FIG. 2) is transferred to an inductive load present at the converter's output (terminals a and b in FIG. 2), regardless of the output power of the high voltage stack. This enables the switching power converter to be operated in zero voltage switching mode, in which switching losses are essentially zero.

In this example both the resonance frequency of the high voltage stack as well as that of the interface circuit are chosen to be equal. However, in a practical design these two resonance frequencies can be chosen sligthly different to give an optimal adjustment of the transient behavior as well as the zero voltage switching performance.

Furthermore, it should be noted that the positions of $L_{interface}$ (10) and $C_{interface}$ (11) in the interface (12) circuit are not limited to that shown in FIG. 2. Although not being the layout of the preferred embodiment, an interface (12) circuit in which the position of $L_{interface}$ (10) and $C_{interface}$ (11) are interchanged will function in essentially the same manner as the interface (12) circuit shown in FIG. 2. The same holds for the high voltage stack (4), in which the positions of $L_{stack}$ (6) and $C_{stack}$ (5) can be interchanged if desired, without offending its essential functionality.

It is another important feature of the present invention that it offers means to eliminate problems associated with the inevitable leakage inductance and the parasitic interwinding output capacitance present in the high voltage output transformer (3). Without the presence of the interface (12) circuit, the leakage inductance and interwinding capacitance will result in reduced available output power and unwanted oscillations at the output terminals of the transformer (3), both of which degrade the performance of the entire DC high voltage generator. For those skilled in the art it is readily understood that with the application of the present interface (12) circuit such problems are no longer existing because the leakage inductance and the interwinding capacitance can be thought to be an integral part of the interface (12) circuit. Hence the inevitable parasitic elements are made beneficial to the overall system performance.

In fact, it is readily recognised by those skilled in the art that a proper geometric design of the output transformer (3) will create a leakage inductance $L_{leak}$ that equals the inductance of $L_{interface}$ (10) in the interface (12) circuit. In that case the inductor $L_{interface}$ (10) will not be physically present, but will be an integral part of the power converter's output transformer (3), which reduces costs and complexity.

What is claimed is:

1. A DC high voltage generator comprising:
    an AC power supply;
    an AC-DC rectifier; and
    means for stabilizing said DC high voltage generator against load variations,
    wherein said stabilizing means stabilize said DC high voltage generator by using pulse width modulation at a constant operating frequency with at least two electromagnetically coupled resonant circuits compensating each others load variation dependency at an operating frequency in such a way that the output voltage is essentially constant.

2. A DC high voltage generator according to claim 1, wherein said stabilizing means comprise passive components.

3. A DC high voltage generator according to claim 2, wherein said passive components comprise at least one inductor and at least one capacitor.

4. A DC high voltage generator according to claim 3, wherein said stabilizing means form an interface between said AC power supply and said AC-DC rectifier.

5. A DC high voltage generator according to claim 4, wherein said AC power supply comprises a transformer.

6. A DC high voltage generator according to claim 5, wherein at least one of said passive components is an integral part of said transformer.

7. A DC high voltage generator according to claim 6, wherein said AC power supply comprises a high frequency switching power converter.

8. A DC high voltage generator according to claim 7, wherein said high frequency switching power converter includes one or more BJTs, MOSFETs, IGBTs, IGCTs or MCTs.

9. A DC high voltage generator according to claim 8, wherein said high frequency switching power converter operates in zero voltage switching mode.

10. A DC high voltage generator according to claim 9, wherein said AC-DC rectifier is coupled with one of the resonant circuits comprising at least one capacitor and at least one inductor to form a high voltage stack.

11. A DC high voltage generator according to claim 9, wherein the resonant circuit is part of an interface between said AC power supply and said AC-DC rectifier.

12. A DC high voltage generator according to claim 10, wherein the high voltage stack is based on high voltage stacks in DC high voltage generators selected from the group consisting of: a parallel-fed series cascaded rectifier system, Nested high voltage generator, Cockroft-Walton type voltage multiplier and Cascade transformer high voltage generator.

13. A DC high voltage generator according to claim 1, wherein said AC power supply comprises a high frequency switching power converter.

14. A DC high voltage generator according to claim 13, wherein said high frequency switching power converter includes one or more BJTs, MOSFETs, IGBTs, IGCTs or MCTs.

15. A DC high voltage generator according to claim 13, wherein said high frequency switching power converter operates in zero voltage switching mode.

16. A DC high voltage generator according to claim 1, wherein said stabilizing means form an interface between said AC power supply and said AC-DC rectifier.

17. A DC high voltage generator according to claim 1, wherein said AC power supply comprises a transformer.

18. A DC high voltage generator according to claim 1, wherein the resonant circuit is part of an interface between said AC power supply and said AC-DC rectifier.

19. A DC high voltage generator according to claim 1, wherein said AC-DC rectifier is coupled with one of the resonant circuits comprising at least one capacitor and at least one inductor to form a high voltage stack.

20. A DC high voltage generator according to claim 19, wherein the high voltage stack is based on high voltage stacks in DC high voltage generators selected from the group consisting of: a parallel-fed, series-cascaded rectifier system, Nested high voltage generator, Cockroft-Walton type voltage multiplier and Cascade transformer high voltage generator.

21. A method for stabilizing a DC high voltage generator, which has an AC power supply and an AC-DC rectifier, against load variations comprising the step of:

coupling two or more resonant circuits to compensate for a load variation of one of the resonant circuits such that the output voltage is substantially constant.

22. The method of claim 21, further comprising stabilizing the DC high voltage generator using passive components.

23. The method of claim 22 further comprising:

coupling the AC-DC rectifier to at least one of the resonant circuits to form a high voltage stack.

24. The method of claim 36 further comprising forming an interface between the AC power supply and the AC-DC rectifier using at least one of the resonant circuits.

25. The method of claim 21, further comprising operating a high frequency switching power converter in zero voltage switching mode.

* * * * *